(12) United States Patent
Borschert et al.

(10) Patent No.: US 8,550,756 B2
(45) Date of Patent: Oct. 8, 2013

(54) DRILL BIT FOR DRILLING HAVING AT LEAST TWO CUTTING EDGES, EACH WITH TWO CUTTING PORTIONS AND A NON-CUTTING PORTION BETWEEN THE TWO CUTTING PORTIONS

(75) Inventors: Bernhard Borschert, Bamberg (DE); Ullrich Krenzer, Zirndorf (DE); Herbert Kauper, Nürnberg (DE); Juergen Schwaegerl, Vohenstrauss (DE)

(73) Assignee: Kennametal Inc., Latrobe, PA (US)

( * ) Notice: Subject to any disclaimer, the term of this patent is extended or adjusted under 35 U.S.C. 154(b) by 1141 days.

(21) Appl. No.: 12/422,000

(22) Filed: Apr. 10, 2009

(65) Prior Publication Data

US 2010/0092259 A1      Apr. 15, 2010

Related U.S. Application Data

(63) Continuation-in-part of application No. PCT/EP2007/008595, filed on Oct. 4, 2007.

(51) Int. Cl.
*B23B 51/02* (2006.01)

(52) U.S. Cl.
USPC ........................................................ 408/230

(58) Field of Classification Search
USPC .......................................... 408/227, 229, 230
IPC ............................................ B23B 51/00, 51/02
See application file for complete search history.

(56) References Cited

U.S. PATENT DOCUMENTS

| 750,537 | A | * | 1/1904 | Hanson | 408/230 |
| 867,639 | A | * | 10/1907 | Bragg | 408/223 |
| 1,407,546 | A | * | 2/1922 | Joseph | 408/223 |
| 1,747,117 | A | * | 2/1930 | Klein | 76/108.6 |
| 4,400,119 | A | | 8/1983 | Clement | |
| 5,312,209 | A | * | 5/1994 | Lindblom | 408/230 |
| 5,622,462 | A | * | 4/1997 | Gakhar et al. | 408/230 |
| 5,931,615 | A | * | 8/1999 | Wiker | 408/230 |

FOREIGN PATENT DOCUMENTS

| DE | 216 607 | 11/1909 |
| DE | 36 24 617 | 1/1988 |
| DE | 36 28 262 | 1/1988 |
| DE | 43 07 553 | 9/1993 |

(Continued)

OTHER PUBLICATIONS

Russian Patent Office, "Official Action", with English language translation thereof, Oct. 5, 2011, 6 pp.

(Continued)

*Primary Examiner* — Daniel Howell
(74) *Attorney, Agent, or Firm* — Larry R. Meenan, Esq.

(57) ABSTRACT

A drill bit for drilling having at least two cutting edges, each with two cutting portions and a non-cutting portion between the two cutting portions. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

16 Claims, 6 Drawing Sheets

(56) References Cited

FOREIGN PATENT DOCUMENTS

| | | |
|---|---|---|
| DE | 44 35 857 | 4/1996 |
| DE | 699 27 417 | 6/2006 |
| EP | 0 278 288 A1 | 1/1988 |
| EP | 0 508 468 | 10/1992 |
| FR | 725 363 | 5/1932 |
| JP | 59 076709 | 5/1984 |
| JP | 03245914 A * | 11/1991 |
| JP | 5-69213 | 3/1993 |
| JP | 10076414 A | 3/1998 |
| JP | 10-109210 | 4/1998 |
| JP | 10-217019 | 8/1998 |
| JP | 2001-105216 A | 4/2001 |
| JP | 2001-269808 A | 10/2001 |
| JP | 2003-048110 A | 2/2003 |
| JP | 2003275913 A * | 9/2003 |
| JP | 2005-205526 A | 8/2005 |
| JP | 2006-110704 A | 4/2006 |
| WO | WO 98/42469 | 10/1998 |
| WO | 2008/046520 A1 | 4/2008 |

OTHER PUBLICATIONS

Japanese Patent Office, "Notice of Reasons of Rejection", with English language translation thereof, Jun. 19, 2012, 6 pp.

* cited by examiner

DRILL BIT FOR DRILLING HAVING AT LEAST TWO CUTTING EDGES, EACH WITH TWO CUTTING PORTIONS AND A NON-CUTTING PORTION BETWEEN THE TWO CUTTING PORTIONS

CONTINUING APPLICATION DATA

This application is a Continuation-In-Part application of International Patent Application No. PCT/EP2007/008595, filed on Oct. 4, 2007, which claims priority from Federal Republic of Germany Patent Application No. 10 2006 049 096.7, filed on Oct. 13, 2006, and Federal Republic of Germany Patent Application No. 10 2007 031 440.1, filed on Jul. 5, 2007. International Patent Application No. PCT/EP2007/008595 was pending as of the filing date of this application. The United States was an elected state in International Patent Application No. PCT/EP2007/008595.

BACKGROUND

1. Technical Field

The present application relates to a drill bit for drilling having at least two cutting edges, each with two cutting portions and a non-cutting portion between the two cutting portions. The present application further relates to a bit for a drill tool extending along a drill center axis in the drill longitudinal direction and having an outwardly extending cutting edge.

2. Background Information

Background information is for informational purposes only and does not necessarily admit that subsequently mentioned information and publications are prior art.

In some drills, the bit is clamped in an end-side groove of a drill body. The cutting edge of the bit runs in a substantially S-shaped manner from a drill center outward to a drill circumference. In the drill longitudinal direction, a chip groove wall of a coiled chip groove adjoins the cutting edge. The chips which are removed during machining via the cutting edge are discharged via the chip groove.

In order to essentially ensure or promote a continuous drilling process which is as trouble-free as possible the chips must or should be discharged reliably and safely via the chip groove. The chip must or should have a suitable shape for this purpose. Thus, the problem often occurs that the machining process leads to the formation of chips which are embodied in a substantially helical manner and some of which take up more free space than the free space provided by the chip groove. This may lead to the chips becoming stuck within the chip groove, so that discharge is no longer reliably essentially ensured or promoted. There is also the risk of chips passing between the drill circumference and the drill wall and becoming stuck there; this leads to damage to the drill wall and to imprecise drill hole geometry and also to greatly increased stressing of the drill tool.

The problem of sufficiently safe removal of chips is encountered for example in long-chipping materials, such as for example high-grade stainless steel, in which very long chips are formed during the machining process.

The use of what are known as chip breakers is known to avoid, restrict, and/or minimize excessively large chips. Thus, some plate-shaped cutting inserts for drill tools have chip breakers which are formed by transverse grooves perpendicularly or virtually perpendicularly to the cutting edge. The cutting edge is in this case therefore interrupted at the positions of the chip breakers.

OBJECT OR OBJECTS

The present application is based on the object of essentially ensuring or promoting safe and reliable removal of chips with good drilling quality.

SUMMARY

According to the present application, the object is achieved by a bit for a drill tool extending along a drill center axis in the drill longitudinal direction and having a cutting edge extending outward from a drill center positioned on the drill center axis. The cutting edge is adjoined, counter to a direction of rotation of the drill, by a free surface and in the drill longitudinal direction by a chip groove. In order to essentially ensure or promote reliable and safe discharge of chips, the cutting edge is now divided into a total of three cutting portions, namely into an active cutting portion which is close to the center and emanates from the drill center, a radially outer active cutting portion which is close to the center, and an inactive cutting portion arranged between the two active cutting portions. The cutting portions are positioned in the front end face of the bit and are therefore not arranged offset from one another in the drill longitudinal direction. Furthermore, the cutting portions in one possible embodiment merge continuously or substantially continuously with one another. The active cutting portion which is close to the center and the inactive cutting portion border each other in this case at an inner cutting corner. The inner cutting corner is positioned on an inner circle, the radius of which is equal to or greater than and in one possible embodiment somewhat greater than a core radius of a drill core. The distance of the cutting corner from the drill center axis is therefore in one possible embodiment slightly greater than the core radius. The drill core is in this case determined by the core material remaining in the center between the chip grooves, i.e. the core diameter is the shortest connection between the chip grooves.

As a result of this configuration, the inactive cutting portion is arranged in the radial direction set back somewhat relative to the inner cutting corner. In the radial direction, the inner cutting corner of the active cutting portion which is close to the center protrudes beyond the inactive cutting portion, so that said inactive cutting portion does not add any machining work. The machining work is resumed by the cutting portion which is remote from the center.

As a result of this specific configuration, the chips which are generated are therefore split, in the case of a continuous cutting edge divided merely into different portions, into two smaller chip parts, thus allowing chips to be removed reliably and without difficulty via the chip groove. The cutting edge therefore runs as a whole on the end face of the, for example conical, bit without axial offset, the inactive cutting portion joining together the two active cutting portions. The term "smaller chip parts" refers in this case to the fact that the width, defined by the length of the cutting edge, of the chip is size-reduced. The chip is therefore divided in the radial direction from the outset. In the axial direction, the individual chip parts are in one possible embodiment not broken, i.e. long-chip partial chips are formed. It is therefore crucial that the cutting edge geometry leads to the formation of two partial chips directly on the cutting edge.

The bit is in this case embodied in one possible embodiment as an exchangeably fastenable bit which can be fastened to a drill body in a clamping manner and/or with the aid of fastening elements. Alternatively, the bit is connected securely, for example by soldering, to the drill body. Finally, it is also possible for the bit to be an integral part of the drill body. For the discharge of chips, the chip geometry of the drill tool is of crucial importance.

The bit is formed by what is known as screw surface grinding or alternatively by cone envelope grinding. Overall, the bit is substantially conical. A main free surface adjoining the cutting edge counter to the direction of rotation has for example a constant or substantially constant free angle. Alternatively thereto, the free surface is divided into a plurality of partial portions having different free angles and the main free surface has for example a kinked course.

In one possible embodiment, the active cutting portion which is close to the center and the inactive cutting portion enclose between them an angle of about less than ninety degrees. This essentially ensures or promotes that the inactive cutting portion is radially set back somewhat or is positioned at most at the same radial height as the inner cutting corner. The angle lies, in one possible embodiment at about eighty degrees, in the range of from about eighty-five degrees to about sixty degrees. The selection of the angle is generally dependent on the material which is to be machined and for which the drill is designed. In the case of soft materials, such as for example light metals such as aluminum, a comparatively acute angle may also be selected. For these soft materials, the minimum angle is about twenty degrees.

According to one possible embodiment configuration, the inactive cutting edge has a curved course. The curved course therefore forms a type of flute between the inner cutting corner and a starting point of the cutting portion which is remote from the center. No engagement with the workpiece takes place within this flute.

In one possible embodiment, the active cutting portion which is remote from the center is adjoined by a wall portion of a chip groove running—viewed in a cross section perpendicular or virtually perpendicular to the drill longitudinal axis—along a circular arc line of a circle having a chip shape radius. As the active cutting portion which is remote from the center forms the end-side delimiting edge of the chip groove, the active cutting portion which is remote from the center therefore has a curved course which is correlated with the chip shape radius. As a result of the curved course, suitable chip shaping is attained, the radius of the chip being determined by the chip shape radius. In addition to the division of the chip, this possible configuration therefore provides at the same time also defined chip shaping, thus forming a relatively small chip both in a suitable size and in a suitable shape. The purposeful division of the chip into a plurality of, in one possible embodiment two, chip parts and the defined chip shaping essentially ensure or promote in one possible embodiment safe discharging of the chip via the chip groove.

In one possible embodiment, the dimensions of the chip shape radius are such that the circle defined by the chip shape radius lies in a plane perpendicular or virtually perpendicular to the drill center axis within a free space which is defined by the course of the cutting edge and a drill circumference line. The dimensions of the chip shape radius are in this case in one possible embodiment such that the circle lies as precisely or substantially precisely as possible within the free space, i.e. it is merely somewhat smaller than the free space. This essentially ensures or promotes that the shaped chip can be discharged freely and without clamping within the chip groove.

For chip shaping which is as uniform as possible and simple production of the cutting edge geometry, the inactive cutting portion and the active cutting portion which is remote from the center merge with each other in one possible embodiment continuously or substantially continuously and in one possible embodiment without kinks. The two cutting portions therefore have a homogeneously merging course.

In one possible embodiment, the two cutting portions have in this case overall a crescent-shaped course. The term "a crescent-shaped course" refers in this case to the fact that the active cutting portion which is remote from the center runs out at an acute angle with respect to the drill circumference. This crescent-shaped configuration forms at the outer cutting corner a type of wedge which safely and reliably essentially ensures or promotes that the chip is guided from the drill wall to the drill axis. This reliably prevents, restricts, and/or minimizes the chip from becoming clamped between the drill wall and a drill back of the drill body.

According to one possible embodiment, a secondary chip angle is formed—viewed in section perpendicular or virtually perpendicular to the drill longitudinal axis—between a radial and a tangent, running through the secondary cutting edge, of the chip groove wall. The secondary chip angle has a value of about less than twenty degrees and is in one possible embodiment in a range between about fifteen degrees and about thirty degrees.

In at least one possible embodiment, the active cutting portion which is close to the center is oriented at an acute angle to the chip groove and the two further cutting portions run along the chip groove, thus forming the delimiting edge of the chip groove.

In one possible embodiment, the inner cutting corner is at a distance from the drill center axis corresponding substantially to the core radius of the drill core. The active cutting portion which is close to the center therefore covers the drill core. In this way, the two active cutting portions are divided in a suitable manner.

In order to attain safe discharge of chips via the chip groove, the total active radial cutting length of the two active cutting portions is divided, according to one possible embodiment, into roughly two-thirds on the cutting portion which is remote from the center and into roughly one-third on the cutting portion which is close to the center. As a result of this division, most of the machining power is exerted by the active cutting portion which is remote from the center. More than eighty percent of the machining volume removed during the machining is in this case removed by the active cutting portion which is remote from the center.

According to one possible embodiment, an inner partial chip groove is associated with the active cutting portion and an outer partial chip groove is associated with the outer active cutting portion for the separated removal of the chips generated by the active cutting portions. The two partial chip grooves are in this case separated from each other, in one possible embodiment by a separating web which starts at the inner cutting corner and runs in one possible embodiment helically in the drill longitudinal direction.

In one possible embodiment, the two partial chips generated during the machining process, namely an inner partial chip generated by the inner active cutting portion and an outer partial chip generated by the outer active cutting portion, are removed separately. This essentially ensures or promotes that the two partial chips do not merge and for example become caught and possibly cause a build-up of chips. As a result of the two partial chip grooves, each partial chip is therefore shaped separately and guided separately from the other chip. Owing to the larger machining volume of the outer active cutting portion, a very long, helically running partial chip is formed, in one possible embodiment during the machining of austenitic stainless steels. Compared to this, comparatively short partial chips are formed in the case of the inner active cutting portion. If two separated partial chip grooves were dispensed with, the short-chip inner partial chip would merge with the long-chip outer partial chip, so that there is the risk of the formation of a snarl chip which is problematic to remove. Overall, the two separated partial chip grooves therefore provide safe and reliable removal of the partial chips.

In one possible embodiment, an inner core radius, formed by the radial distance between the drill center axis and the inner partial chip groove, is in this case smaller than an outer core radius, which is in turn formed by the radial distance between the drill center axis and the outer partial chip groove. The groove base of the inner partial groove is therefore oriented more closely relative to the drill center axis.

In the sense of reliable removal of chips, the partial chip grooves therefore generally differ in their embodiment. For further improvement of the removal of chips, the core radii in one possible embodiment vary differently in the drill longitudinal direction. As a result of the different variation of the partial chip grooves in the drill longitudinal direction, the chip conveyance direction is influenced in the longitudinal direction in a defined manner in such a way that the two partial chips do not merge with each other, but rather are formed next to each other and are subsequently also discharged next to each other.

In one possible embodiment, provision is in this case made for the outer core radius to decrease in the drill longitudinal direction. As a result of the decrease in the outer core radius, the depth of the chip groove is increased, so that the free space for the outer partial chip becomes larger with increasing distance from the cutting region. In one possible embodiment, provision is additionally made for the inner core radius to remain at least constant or substantially constant or to increase in the drill longitudinal direction. Overall, as a result of these measures, the two partial chips are guided differently in the drill longitudinal direction, thus ruling out the risk of the partial chips becoming stuck on one another.

For reliable running side-by-side of the two partial chips, provision is in one possible embodiment also made for the two partial chip grooves to have different angles of twist, wherein in one possible embodiment the outer partial chip groove has a larger angle of twist than the inner partial chip groove. The term "angle of twist" refers in this case generally to the orientation of the respective partial chip groove based on the drill longitudinal direction.

In one possible embodiment, the inner partial chip groove has a smaller chip shape radius than the outer partial groove. The chip shape radius is decisive for the shaping and thus for the diameter of the conventionally helical chip. This measure therefore essentially ensures or promotes that the inner partial chip has, compared to the outer partial chip, a generally much smaller diameter, so that the two partial chips differ also in their diameters.

In one possible embodiment, the two partial chip grooves also differ with regard to the secondary chip angle formed in each case between a chip groove wall and a radial by the drill center axis. In the case of the inner partial chip groove, the corresponding radial runs through the outer cutting corner and forms with the chip groove wall an outer secondary chip angle. In the case of the outer partial chip groove, the radial runs through the outer cutting corner and forms with the chip groove wall an outer secondary chip angle. The two secondary chip angles in this case differ, the inner secondary chip angle in one possible embodiment being smaller in terms of amount than the outer secondary chip angle. Overall, the outer secondary chip angle has, owing to the crescent-shaped configuration, a comparatively large value in the range of from about twenty degrees to about thirty degrees. The inner secondary chip angle is, on the other hand, much smaller in terms of amount, and is for example merely half the size. In one possible embodiment, provision is also made for the outer secondary chip angle to be formed as an acute, "positive" secondary chip angle, the inner secondary chip angle being an obtuse, "negative" secondary chip angle.

Furthermore, provision is additionally made for the outer secondary chip angle to vary, and in one possible embodiment to become smaller in terms of amount, in the drill longitudinal direction.

In one possible embodiment, the two partial chip grooves converge in a common chip groove. The converging takes place in this case set apart from the cutting portions when the chips are already sufficiently shaped and run next to one another. That is to say, as soon as the shaped partial chips are separated next to one another, they can easily be discharged in a common chip groove. As a result, the design measures are restricted merely to the region of the bit and it is not necessary or desired to form the two partial chip grooves over the entire length of the drill. In the case of a modular drill tool in which a bit is inserted into a drill body, the two partial chip grooves are in one possible embodiment formed merely in the bit. The two partial chip grooves of the bit then open into a common chip groove of the drill body.

Owing to the purposeful removal even of the inner partial chip, an increase in the machining volume of the inner active cutting portion is provided in the case of this variant embodiment with the two partial chip grooves compared to a variant embodiment without partial chip grooves. In the case of the variant embodiment with the two partial chip grooves, the active radial length of the inner active cutting portion is therefore in one possible embodiment equal to or greater than approximately fifty percent of the total active radial cutting length. The radial length of the inner active cutting portion is in this case in one possible embodiment up to two-thirds of the total active radial cutting length. The radial length of the inner active cutting portion is in this case defined by the radius of an inner circle on which the inner cutting corner is positioned. The total active radial cutting length is defined by the drill radius. In the case of the variant embodiment with the two partial chip grooves, the ratio of these two radii is therefore approximately one-half to approximately two-thirds.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Possible embodiments of the present application will be described hereinafter in greater detail with reference to the drawings, in which.

DESCRIPTION OF EMBODIMENT OR EMBODIMENTS

Figure 1:
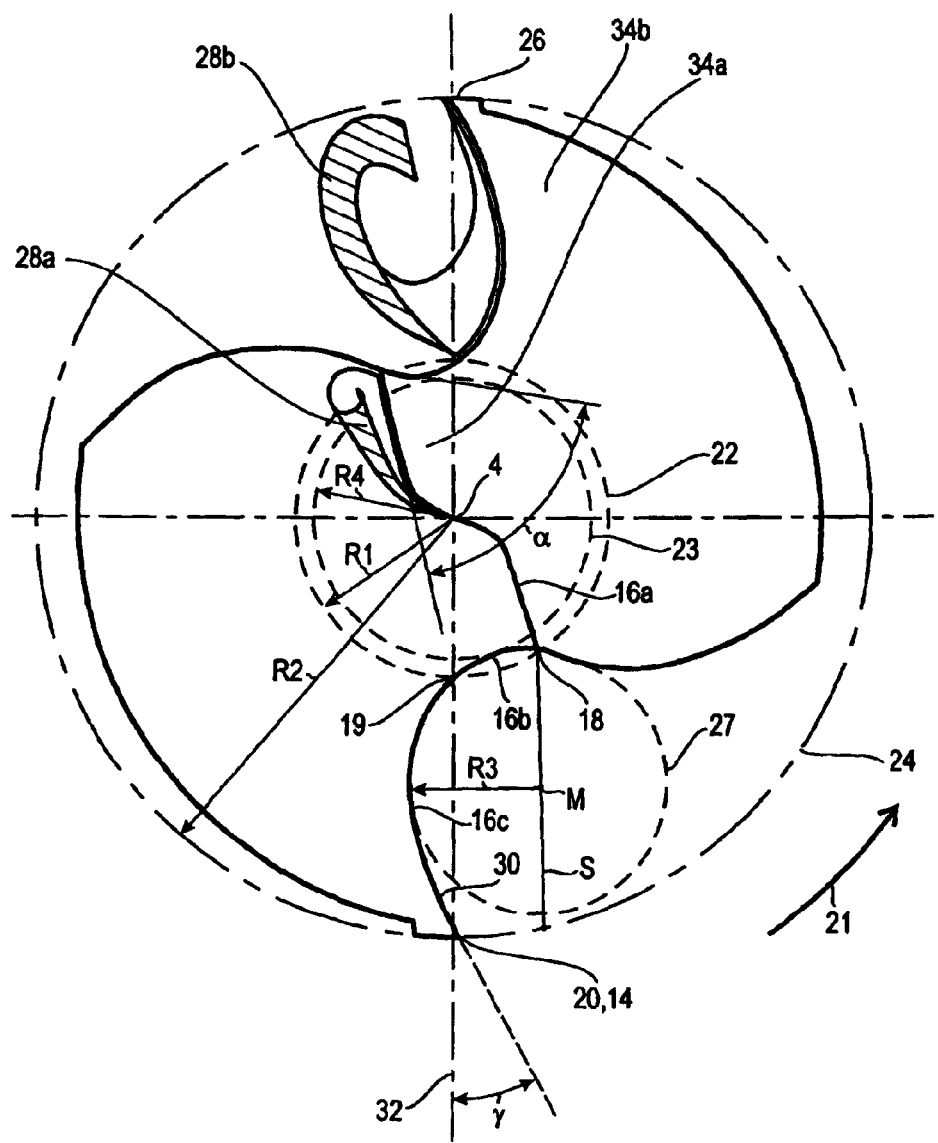
FIG. 1 is a schematic and simplified plan view onto a bit according to a first variant embodiment.

In the figures, equivalent parts are provided with the same reference numerals.

Figure 2:
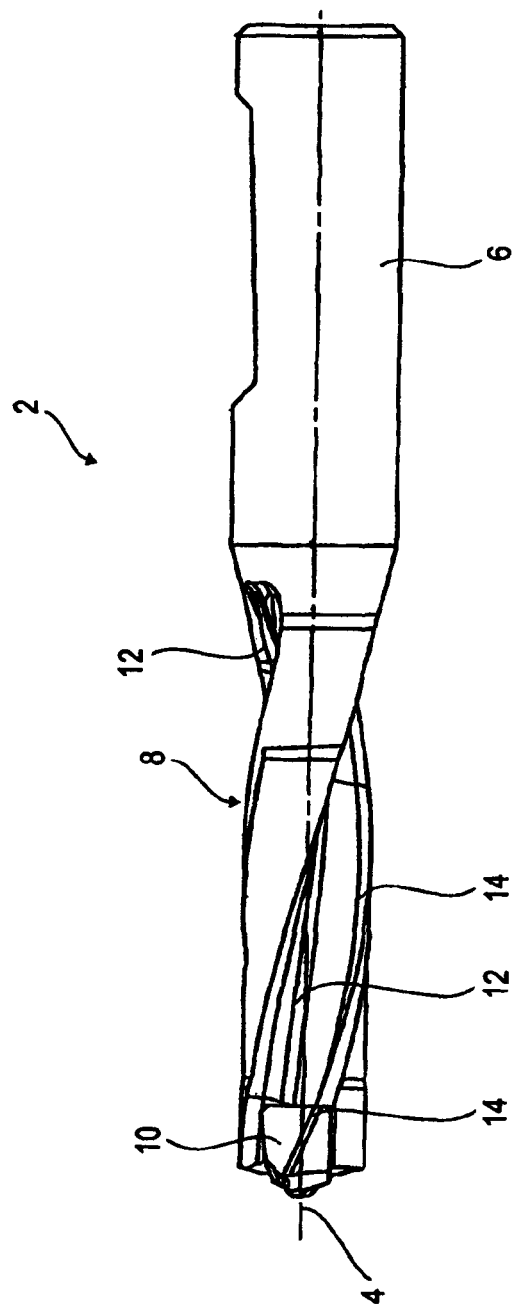
FIG. 2 is a schematic and simplified side view of a drill.

As may be seen from FIG. 2, the twist drill 2 shown therein extends in the longitudinal direction along a drill center axis 4. It has at its trailing end a shank portion 6 with which it is clamped into a suitable machining device. The shank portion 6 is adjoined by a drill body 8 having at its front end a bit 10. The twist drill 2 shown comprises two helically running chip grooves 12 extending into the bit 10. Coolant holes, which issue at the front end or close to the tip of the bit 10, are conventionally passed through the entire twist drill 2. Along the chip groove 12 there runs in the drill longitudinal direction a respective secondary cutting edge 14 which is therefore also embodied so as to run helically.

In one possible embodiment, the bit 10 is embodied as an exchangeable, separate part which is fastened in the drill body 8 in a clamping manner. The twist drill 2 shown in FIG. 2 is therefore a modular drill tool. A bit 10, which is connected to the drill body 8 securely, for example by soldering, can in principle also be provided. Furthermore, it is also possible for the twist drill 2 provided to be what is known as a full hard metal drill in which the bit is an integral part of the drill body 8.

The specific cutting edge geometry of the bit 10 may be seen from the plan view according to FIG. 1. According to this, one possible embodiment provides, starting from the drill center positioned on the drill center axis 4, two respective outwardly extending cutting regions each having three cutting portions 16a, b, c. The cutting portions run along the end face, which is in one possible embodiment in the form of an envelope of a cone, without offset. More than two, for example three, cutting regions each having three cutting portions 16a-c can in principle also be provided. The bit 10 is embodied so as to be rotationally symmetrical with respect to the drill center axis 4. In the case of the variant embodiment shown, the bit 10 is rotationally symmetrical through one hundred eighty degrees. The first cutting portion 16a forms an active cutting portion, which is close to the center, and extends from the drill center axis 4 for example in a broadly radial direction up to an inner cutting corner 18. In one possible embodiment, the two active cutting portions 16a which are close to the center form a partial cutting edge which runs in a substantially S-shaped manner and comprises in the region of the drill center axis 4 a transverse cutting edge running rectilinearly. The inner cutting corner 18 is adjoined by an inactive cutting portion 16b which merges at a starting point 19 continuously and seamlessly with an active cutting portion 16c which is remote from the center. The active cutting portion 16c which is remote from the center extends up to an outer cutting corner 20.

During use, the twist drill 2 rotates about the drill center axis 4 in the direction of rotation 21. In this case, the inner cutting corner 18 defines an inner circle 22 which is illustrated in FIG. 1 by broken lines and has an inner circle radius R1 and the outer cutting corner 20 defines an outer circle 24 which is illustrated in FIG. 1 by dot-dash lines and has an outer circle radius R2. The outer circle radius R2 corresponds in this case to the drill nominal radius and defines the drill circumference. The outer cutting corner 20 is adjoined in the longitudinal direction by the secondary cutting edge 14. In the region of the secondary cutting edge 14, a chamfer 26, with which the twist drill 2 is supported on a drill wall, is provided on the outer cutting corner 20.

The inner cutting corner 18 is positioned, viewed in the radial direction, somewhat further outward than the inactive cutting portions 16b. As the inactive cutting portion 16b has at the same time the point of the chip groove 12 that is closest to the center, the spacing of the cutting corner 18, and thus the radius R1 of the inner circle 22, is somewhat larger than a core radius R4 of a drill core 23, which is indicated by a broken line. The drill core 23 is in this case determined by the core material remaining in the center between the chip grooves 2. The core radius R4 is accordingly defined by the shortest halved distance between the two chip grooves 12. As a result of this configuration, the central cutting portion 16b is set back in the radial direction somewhat relative to the inner cutting corner 18, so that the central cutting portion 16b does not participate in the machining work. The first point, which participates again in the machining work, is the starting point 19 of the cutting portion 16c which is remote from the center. A cutting angle α, which lies for example in the region of ninety degrees and is in one possible embodiment somewhat smaller than ninety degrees, is formed between the active cutting portion 16a which is close to the center and the central inactive cutting portion 16b. The cutting angle α is in this case defined by the angle between the tangent, running through the inner cutting corner 18, of the two cutting portions 16a, b, in one possible embodiment through the angle between the projections of the two tangents onto a plane orthogonal to the drill center axis.

There are therefore formed for each half of the drill two cutting portions 16a,c which are spatially separated from each other and carry out the machining performance. This also produces two separated chip parts 28a, b. The specific geometry of the cutting edge with the three cutting portions 16a-c and the central inactive cutting portion 16b therefore acts in the manner of a chip divider while the course of the cutting edge remains continuous.

In the one possible embodiment according to FIG. 1, the total cutting length acting in the radial direction is divided onto the two cutting portions 16a, c, in one possible embodiment into roughly two-thirds on the active cutting portion 16c which is remote from the center and into roughly one-third on the active cutting portion 16a which is close to the center. The term "cutting length acting in the radial direction" refers in this case to the radial length of the respective cutting portion 16a, c in the radial direction. The radially acting cutting length of the cutting portion 16a which is close to the center therefore corresponds to the inner circle radius R1 and the radially acting cutting length of the cutting portion 16c which is remote from the center corresponds to the difference between the outer circle radius R2 and the inner circle radius R1. The inner circle radius R1 lies generally in a range of between approximately twenty percent and approximately forty percent of the outer circle radius R2. The inner circle radius R1 is in this case somewhat larger than the core radius R4. In one possible embodiment in the case of drills 2 in which the core radius has more than about thirty percent of the outer circle radius, the inner circle radius R1 corresponds substantially to the core radius R4 of the drill core 23.

For the striven-for safe removal of chips, in addition to the division of the chip into the two chip parts 28a, b, defined chip shaping is also important. In order to attain this, provision is first made for the two cutting portions 16b, c to merge with each other homogeneously and seamlessly along a curved line. The two cutting portions 16b, c are in this case curved in such a way that a chip groove wall 30, which delimits the chip groove 12 and adjoins these cutting portions 16b, c, runs along a circular arc line having a chip shape radius R3. The chip shape radius R3 lies within a plane orthogonal to the drill center axis and forms a notional chip circle 27 which lies in this plane and has a center point M. The chip shape radius R3 determines the chip radius of the chip part 28b which forms during the machining process. The dimensions of the chip shape radius R3 are such that the chip part 28b which is formed is smaller than or at most the same size as the free space, created by the chip groove 12, relative to the drill wall, the course of which corresponds to the outer circle 24 illustrated in FIG. 1 by the dot-dash line. The chip shape radius R3 is therefore slightly smaller than or the same size as half a stretch s which begins at the inner cutting corner 18, runs through the center point M of the chip circle 27 and ends at the outer circle 24.

Owing to the specific geometry of the cutting portions 16b, c with the portion of the chip groove wall 30 that runs in a curved manner, overall a crescent-shaped configuration of the cutting portions 16b, c is attained. Overall, a flute is formed by this crescent-shaped course between a radial 32, running through the outer cutting corner 20, and the chip groove wall 30 or the cutting portion 16c. The cutting portion 16c which is remote from the center runs out in a wedge-shaped manner and acutely toward the outer circle 24. A secondary chip angle γ, which is in one possible embodiment larger than about twenty degrees, is formed, viewed in a plane perpendicular or virtually perpendicular to the drill center axis 4, between the radial 32 and the tangent of the chip groove wall 30 at the outer cutting corner 20. As a result of this crescent-shaped configuration, the resulting chip part 28b is led safely away from the drill wall, thus reliably ruling out the risk of jamming between the chamfer 26 and the drill wall.

The bit 10 is formed in one possible embodiment by a grinding process. Screw surface grinding, which is known per se, or alternatively cone grinding, which is also known per se, is in this case carried out. The bit 10 is overall conical in its embodiment. The individual cutting portions 16a-c therefore do not lie in a common orthogonal plane but rather also have a component in the direction of the longitudinal axis. The cutting portions 16a, c are each adjoined, counter to the direction of rotation 21, by main free surface regions 34a, b. Said main free surface regions each enclose, relative to the cutting portions 16a, c, a free angle which is defined as an angle between a plane orthogonal to the drill center axis 4 and a tangent, running perpendicularly or virtually perpendicularly to the respective cutting portion 16a, c, of the respective main free surface region 34 a, b. Depending on the grinding path and configuration selected, the main free surface regions 34a, b have the same or different free angles. In the case of different free angles, the individual main free surface regions 34a, b merge with one another in one possible embodiment continuously or substantially continuously and in one possible embodiment also seamlessly.

The two cutting portions 16a, which are close to the center and oppose each other with respect to the drill center axis 4, form beyond the drill center a substantially S-shaped cutting region with what is known as the transverse cutting edge. In one possible embodiment, the cutting portions 16a are positioned on a mountain ridge-type elevation descending steeply toward the main free surface region 34a. In this case, a comparatively large free angle in the range of from about ten degrees to about thirty degrees is therefore formed, whereas the free angle of the main free surface region 34b is much smaller and lies in the range of from about six degrees to about twelve degrees.

Overall, the selected cutting edge geometry provides safe and reliable removal of chips even in the case of difficult materials, such as for example long-chipping, high-grade stainless steels. This is attained by the purposeful breaking of the chips into two chip parts 28a, b and also, in addition, by the defined chip shaping, in one possible embodiment of the chip part 28b.

The variant embodiment described hereinafter with reference to FIGS. 3 to 6 differs from the variant embodiment described with reference to FIGS. 1 and 2 substantially in terms of improved removal of chips in the case of a substantially unaltered configuration of the cutting edge with the different cutting portions 16 a-c. That which was stated for FIGS. 1 and 2 with regard to the formation of the individual cutting portions 16a-c therefore applies equally to the variant embodiment according to FIGS. 3 to 6.

Figure 3A:
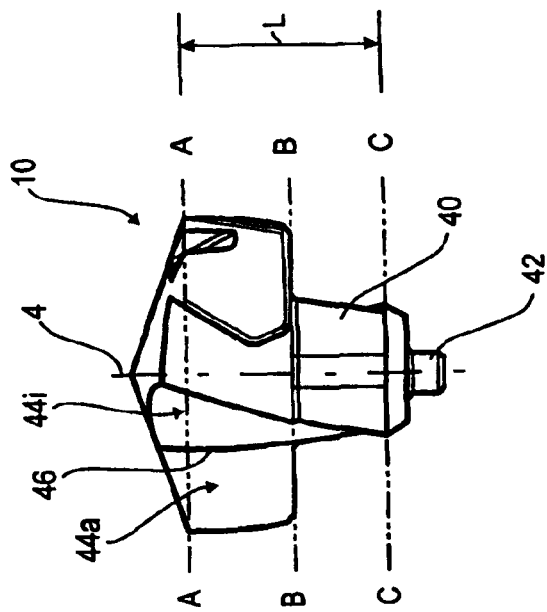
FIG. 3A is a schematic and simplified side view of a bit according to a second variant embodiment.
Figure 6:
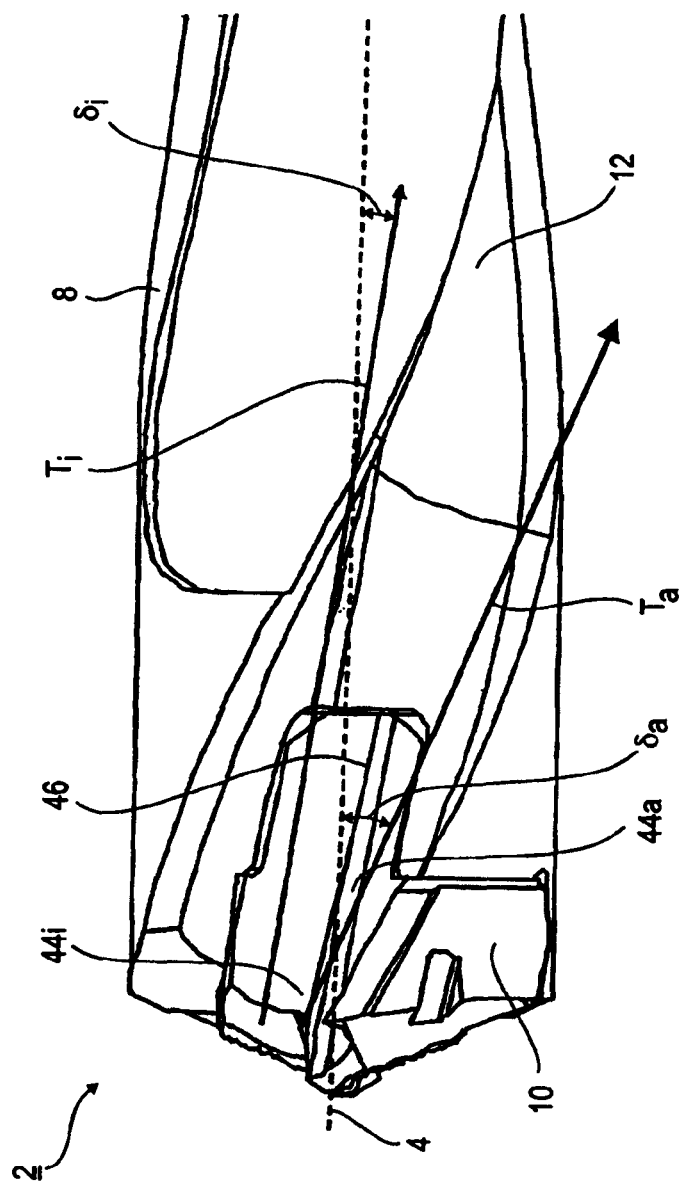
FIG. 6 is a schematic and simplified side view of certain details of a twist drill having the bit according to FIG. 3A.

The bit 10 according to FIG. 3A is provided as an exchangeable bit 10 for fastening in the drill body 8, such as is illustrated in FIG. 6. The bit 10 is in this case possibly fastened 575 in a clamping manner. It has an envelope of a cone-like end face at which the individual cutting portions 16a-c run as described with reference to FIG. 1. A fastening pin 40 with a terminally arranged centering pin 42 is provided at the end of the bit 10 that opposes the front side.

Figure 3B:
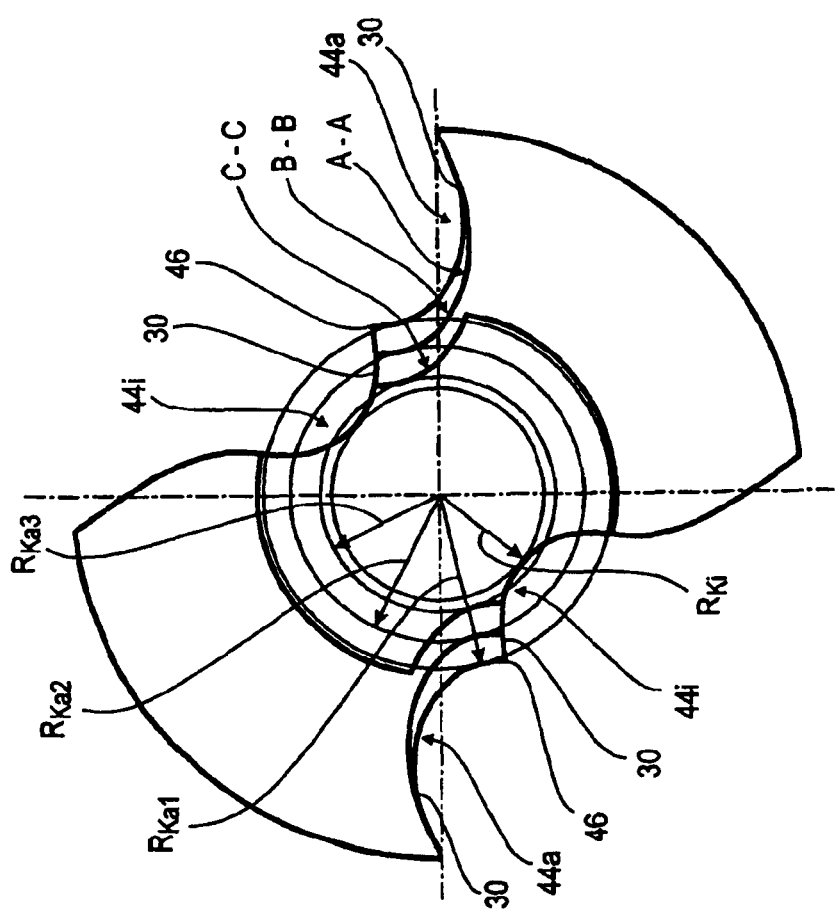
FIG. 3B is a schematic and simplified plan view onto a superimposition of a plurality of sections through the bit according to FIG. 3A in accordance with the sectional planes indicated in FIG. 3A.
Figure 4:
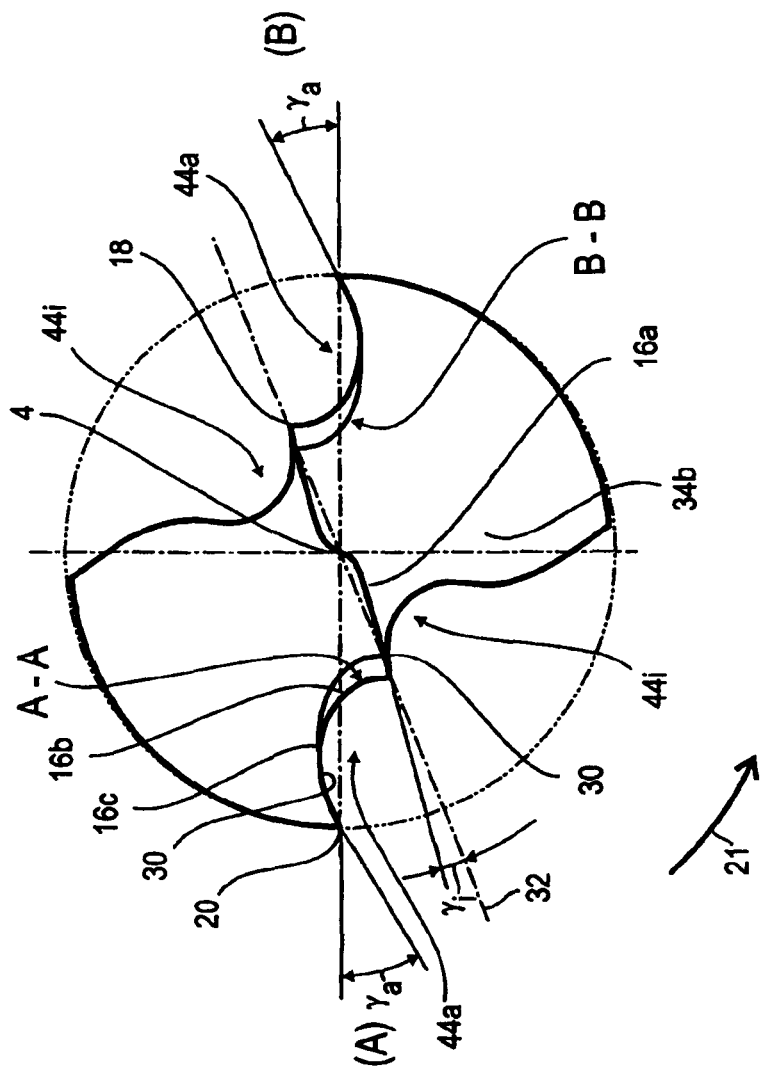
FIG. 4 is a schematic and simplified plan view onto the bit according to FIG. 3A.

FIG. 3B shows a superimposition of a plurality of sectional 581 views according to the sections A-A, B-B, C-C according to the sectional planes of FIG. 3A. FIG. 4 is a plan view onto the bit 10 according to FIG. 3A and clearly shows the cutting course. Finally, FIG. 5 is a further sectional view with reference to which further features will be described.

As may be seen from FIG. 4, the inner active cutting portion 16a, which extends up to the inner cutting corner 18, runs, in the case of this variant embodiment too, starting from the drill center axis 4. Said inner cutting corner is adjoined by the central, inactive cutting portion 16b which merges continuously and seamlessly with the outer active cutting portion 16c which ends on the outer circumference of the drill at the outer cutting corner 20.

Figure 5:
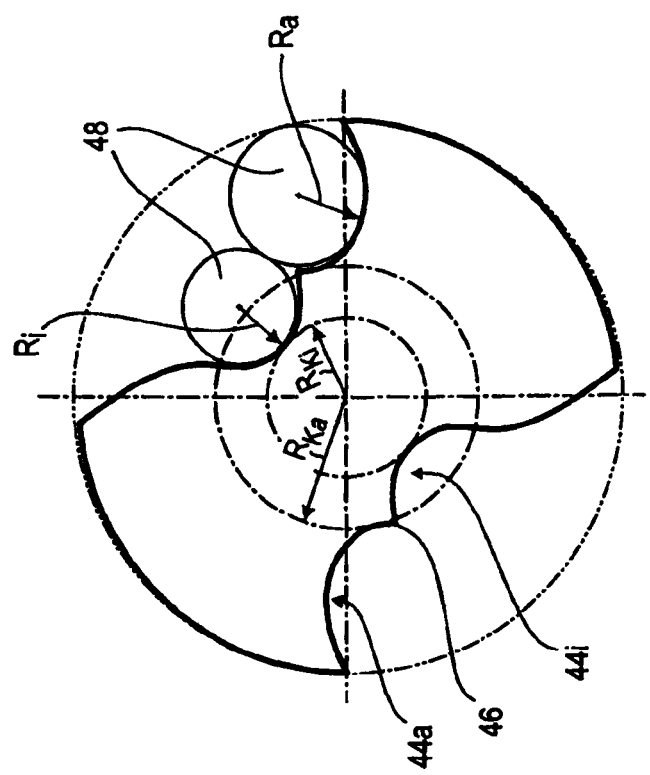
FIG. 5 is a further schematic and simplified sectional view through the bit according to FIG. 3A, roughly in the region of the sectional plane A-A.

As may be seen very clearly from FIGS. 3B, 4 and 5, two partial chip grooves, namely an outer partial chip groove 44a and an inner partial chip groove 44i, are formed in the free space between the outer cutting corner 20 and the main free surface region 34b advancing in the direction of rotation 21. The two partial chip grooves 44a, i are separated from each other by a separating web 46 which begins at the inner cutting corner 18 and extends, in one possible embodiment helically, in the longitudinal direction. The separating web 46 is in one possible embodiment rounded or provided with a chamfer.

The outer partial chip groove 44a is associated with the outer active cutting portion 16c and begins directly adjoining the cutting portion 16c. The inner partial chip groove 44i is associated with the inner cutting portion 16a. Owing to the reduction of the cutting edge required or desired to form the inner cutting portion 16a, the inner partial chip groove 44i begins in the axial direction set somewhat apart from the inner cutting portion 16a in the end region, which is close to the center, of the advancing main free surface region 34b.

Two separate grinding processes are provided to form the two partial chip grooves 44a, 44i, one of the two partial chip grooves 44a, 44i being formed in each grinding process. In contrast thereto, in the case of the variant embodiment of FIG. 1, merely one grinding process is provided to form the chip groove 12 illustrated therein, before the crescent-shaped configuration, and thus the formation of the cutting portions 16b, 16c, is attained conventionally thereafter by way of an additional grinding process.

As may clearly be seen, in one possible embodiment in FIG. 5, the groove base of the two partial grooves 44a, i runs in an arcuate manner and in one possible embodiment substantially along a circular arc line. The region having the smallest radius of curvature of the respective partial chip groove 44a, i defines in each case a chip shape radius, namely an inner chip shape radius $R_i$ and also an outer chip shape radius $R_a$. The inner chip shape radius $R_i$ is in this case smaller than the outer chip shape radius $R_a$. The chip shape radii define in this case at the same time chip spaces 48 which are illustrated by the circles drawn in FIG. 5. The partial chip grooves 44a, i are now arranged and formed in such a way that the chip spaces 48 formed by them do not intersect, but rather at most—as in FIG. 5—touch one another.

During the machining process, the outer cutting portion 16c forms an outer partial chip which runs out into the outer partial chip groove 44a where it is shaped, in accordance with the chip shape radius $R_a$, to form a long-chip, helical outer partial chip. Accordingly, an inner partial chip is also formed in the inner partial chip groove 44i. The spatial separation of the two partial chip grooves 44a, i and of the chip spaces 48 defined by them essentially ensures or promotes that the two partial chips are formed next to each other and do not merge with each other. This essentially ensures or promotes reliable and safe removal of the two partial chips.

In addition to the different chip shape radii $R_i$, $R_a$, what are known as the core radii are also different, as may be seen from FIG. 5. The core radii are in this case determined by the distance from the drill center axis 4 to the respective partial chip groove 44a, i. Thus, an outer core radius $R_{Ka}$ is defined by the outer partial chip groove 44a and an inner core radius $R_{Ki}$ is defined by the inner partial chip groove. The inner core radius $R_{Ki}$ is in this case smaller than the outer core radius $R_{Ka}$.

The two partial chip grooves 44a, 44i also differ with regard to their respective secondary chip angle, namely the outer secondary chip angle $\gamma_a$ and the inner secondary chip angle $\gamma_i$, as may be seen from FIG. 4. The outer secondary chip angle $\gamma_a$ corresponds in this case to the secondary chip angle $\gamma$ such as was described with reference to FIG. 1. The inner secondary chip angle $\gamma_i$ is formed by the angle between the radial 32, running through the inner cutting corner 18, and the groove wall 30 of the inner partial chip groove 44i at the inner cutting corner 18. In contrast to the outer secondary chip angle $\gamma_a$, which is embodied as an acute, "positive" secondary chip angle, the inner secondary chip angle $\gamma_i$ is embodied as an obtuse, "negative" secondary chip angle. Also in terms of amount, the inner secondary chip angle $\gamma_i$ is smaller than the outer secondary chip angle $\gamma_a$ and is, in terms of amount, for example half as large as the outer secondary chip angle $\gamma_a$.

In addition to the different configuration of the two partial chip grooves 44a, i within each sectional plane, provision is additionally made, for reliable removal of chips, for the partial chip grooves 44a, i to vary differently in the longitudinal direction. This is apparent in one possible embodiment from FIG. 3B and also from FIG. 4.

The outer core radius $R_K$, decreases continuously in the longitudinal direction, as may be seen from the different courses of the chip groove wall 30 of the outer chip groove 44a in accordance with the sectional planes A-A, B-B, C-C in FIG. 3B. At the same time, the inner core radius $R_{Ki}$ remains constant or substantially constant or even increases somewhat. As a result of this measure, the chip groove wall 30 of the inner partial chip groove 44i runs parallel or virtually parallel to the drill center axis 4, whereas the chip groove wall 30 of the outer partial chip groove 44a is drawn toward the drill center axis, so that the free space for the chip is enlarged.

At the same time, the outer secondary chip angle $\gamma_a$ also decreases with increasing distance from the cutting portions 16a-c, as may be seen from FIG. 4. In the left half of the diagram the outer secondary chip angle $\gamma_a$ is in this case shown at the level of the sectional plane A-A and in the right half of the diagram the secondary chip angle $\gamma_a$ is shown at the level of the sectional plane B-B. To mark the sectional planes, in the figures an A or a B has in each case been added in brackets for the respective sectional plane after the reference numerals for the outer secondary chip angle $\gamma_a$.

Finally, a further distinguishing feature may also be seen from FIG. 6 in which arrows indicate an outer conveyance direction $T_a$ for the outer partial chip and an inner conveyance direction $T_i$ for the inner partial chip. The conveyance directions $T_a$, are in this case defined by the respective associated angle of twist $\delta_i$, $\delta_a$ (inner angle of twist $\delta_i$, outer angle of twist $\delta_a$). As may be seen from FIG. 6, the inner angle $\delta_i$ of twist is in this case much smaller than the outer angle of twist $\delta_a$, so that the inner conveyance direction $T_i$ runs much more steeply and more parallel or virtually parallel to the drill center axis 4 than the outer conveyance direction $T_a$.

The two partial chip grooves 44a, 44i, which are separated from each other by the separating rim 46, open into the common chip groove 12 in the drill body 8 and are therefore diverted further in the drill body 8 within the common chip groove 12.

Overall, the arrangement of the two separated partial chip grooves 44a, i, in one possible embodiment the different configuration thereof and the different course thereof in the drill longitudinal direction, essentially ensures or promotes reliable, separate removal of the outer partial chip and the inner partial chip.

In accordance with at least one possible embodiment, the drill bit has a central rotational axis 4 and at least one outwardly-extending cutting edge 16. The at least one cutting edge 16 comprises a first cutting portion 16a and a second cutting portion 16c. The first cutting portion 16a is disposed adjacent and to extend substantially from the drill central rotational axis 4, while the second cutting portion 16c is disposed further from the drill central rotational axis 4 than the first cutting portion 16a. The first and second cutting portions 16a,c are designed to contact and cut a workpiece in a drilling process. The cutting edge 16 also has a non-cutting portion 16b which is positioned between and adjoining the cutting portions 16a,c. The non-cutting portion 16b is designed and positioned such that it will neither contact and nor cut a workpiece in a drilling process. The first cutting portion 16a and the non-cutting portion 16b meet at a first cutting corner 18. The non-cutting portion 16b is radially closer to the central rotational axis 4 than the first cutting corner 18. The first cutting portion 16a and the non-cutting portion 16b, at the cutting corner 18, define a cutting angle of ≤90°. The non-cutting portion 16b has a cross-sectional profile in a plane perpendicular to the central rotational axis 4 which is configured such that for any point on the non-cutting portion 16b, an extended tangent immediately on one side of the point lies on top of another extended tangent immediately on the other side of the point. In other words, the non-cutting portion 16b has a cross-sectional profile in a plane perpendicular to the central rotational axis 4 which is a well-behaved or continuous curve without any interruptions or kinks in the curve, such as an angular change of direction or undulation.

In accordance with at least one possible embodiment, the drill tool 2 is designed to cut metal. In another possible embodiment, the drill 2 is designed to cut holes of substantial depth and/or width in a workpiece having a substantial thickness, such as a large block of material, as opposed to a thinner or thin sheet of material.

The aim of the present application is to obtain a good system for removing chips from a drill tool 2. To this end, the bit 10 of the drill tool comprises a cutting region which is divided into three cutting sections, a central cutting section 16b forming an inactive cutting section which borders an inner cutting corner 18 on an active cutting section 16a close to the center. The distance R1 of the inner cutting corner 18 from the central axis 4 of the drill bit is somewhat larger than a core radius R4 of the core 23 of a drill bit, and the inactive cutting section 16b is therefore moved back in the radial direction approximately opposite the inner cutting corner 18. In this way, during operation, the chips removed are split into two groups parts 28a, 28b, thereby obtaining a reliable chip removal system.

One feature or aspect of an embodiment is believed at the time of the filing of this patent application to possibly reside broadly in a bit 10 for a drill tool 2 extending along a drill center axis 4 in the drill longitudinal direction and having an outwardly extending cutting edge, wherein the cutting edge has an active cutting portion 16 which is oriented toward the drill center axis 4 and is close to the center, a radially outer active cutting portion 16c which is remote from the center and also, between the active cutting portions 16a, c, an inactive cutting portion 16b, the active cutting portion 16a which is close to the center and the inactive cutting portion 16b bordering each other at an inner cutting corner 18 and the distance R1 of the cutting corner 18 from the drill center axis being equal to or greater than the core radius R4 of a drill core 23.

Another feature or aspect of an embodiment is believed at the time of the filing of this patent application to possibly reside broadly in the bit 10, wherein the active cutting portion 16a which is close to the center and the inactive cutting portion 16b enclose between them a cutting angle α of about less than or equal to ninety degrees.

Yet another feature or aspect of an embodiment is believed at the time of the filing of this patent application to possibly reside broadly in the bit 10, wherein the inactive cutting edge 16b has a curved course.

Still another feature or aspect of an embodiment is believed at the time of the filing of this patent application to possibly reside broadly in the bit 10, wherein in the drill longitudinal direction the active cutting portion 16c which is remote from the center is adjoined by a chip groove wall 30 running—viewed in a section perpendicular or virtually perpendicular to the drill center axis 4—along a circular arc line of a circle having a chip shape radius R3.

Another feature or aspect of an embodiment is believed at the time of the filing of this patent application to possibly reside broadly in the bit 10, wherein the dimensions of the chip shape radius R3 are such that the circle defined by the chip shape radius R3 lies—in a plane perpendicular or virtually perpendicular to the drill center axis 4—within a free space which is delimited by the cutting edge 16a, b, c and an outer circle 24 defining a drill circumference.

Yet another feature or aspect of an embodiment is believed at the time of the filing of this patent application to possibly reside broadly in the bit 10, wherein the inactive cutting portion 16b and the active cutting portion 16c which is remote from the center merge with each other without kinks.

Still another feature or aspect of an embodiment is believed at the time of the filing of this patent application to possibly reside broadly in the bit 10, wherein the inactive cutting portion 16b and the active cutting portion 16c which is remote from the center have a crescent-shaped course.

A further feature or aspect of an embodiment is believed at the time of the filing of this patent application to possibly reside broadly in the bit 10, wherein the cutting portion 16c which is remote from the center ends at an outer cutting corner 20 which is adjoined by a secondary cutting edge 14 running in the drill longitudinal direction, wherein—viewed in a section perpendicular or virtually perpendicular to the drill center axis 4—a chip groove wall 30 encloses in the region of the secondary cutting edge 14, relative to a radial 32 extending in the radial direction, a secondary chip angle γ which is greater than twenty degrees.

One feature or aspect of an embodiment is believed at the time of the filing of this patent application to possibly reside broadly in the bit 10, wherein the active cutting portion 16a which is close to the center is oriented at an angle to the chip groove 12 and the two further cutting portions 16b, c form rims of the chip groove 12.

Another feature or aspect of an embodiment is believed at the time of the filing of this patent application to possibly reside broadly in the bit 10, wherein the distance R1 of the inner cutting corner 18 from the drill center axis 4 corresponds substantially to the core radius of the drill core 23.

Yet another feature or aspect of an embodiment is believed at the time of the filing of this patent application to possibly reside broadly in the bit 10, wherein the total active radial cutting length is divided into roughly two-thirds on the cutting portion 16c which is remote from the center and into roughly one-third on the cutting portion 16a which is close to the center.

Still another feature or aspect of an embodiment is believed at the time of the filing of this patent application to possibly reside broadly in the bit 10, wherein an inner partial chip groove 44i is associated with the inner active cutting portion 16a and an outer partial chip groove 44a, which is separated from the inner partial chip groove 44i, is associated with the outer active cutting portion 16c for the removal of chips.

A further feature or aspect of an embodiment is believed at the time of the filing of this patent application to possibly reside broadly in the bit 10, wherein an inner core radius $R_{Ki}$, formed by the radial distance between the drill center axis 4 and the inner partial chip groove 44i, is smaller than an outer core radius $R_{Ka}$, formed by the radial distance between the drill center axis 4 and the outer partial chip groove 44a.

Another feature or aspect of an embodiment is believed at the time of the filing of this patent application to possibly reside broadly in the bit 10, wherein the inner and the outer core radius $R_{Ki}$, $R_{Ka}$ vary differently in the drill longitudinal direction.

Yet another feature or aspect of an embodiment is believed at the time of the filing of this patent application to possibly reside broadly in the bit 10, wherein the outer core radius $R_{Ka}$ decreases in the drill longitudinal direction.

Still another feature or aspect of an embodiment is believed at the time of the filing of this patent application to possibly reside broadly in the bit 10, wherein the inner core radius $R_K$, remains at least constant or substantially constant in the drill longitudinal direction.

A further feature or aspect of an embodiment is believed at the time of the filing of this patent application to possibly reside broadly in the bit 10, wherein the two partial chip grooves 44a, i have different angles of twist $\delta_a$, $\delta_i$, and in one possible embodiment the outer partial chip groove 44a has a larger angle of twist $\delta_a$ than the inner partial chip groove 44i.

One feature or aspect of an embodiment is believed at the time of the filing of this patent application to possibly reside broadly in the bit 10, wherein the inner partial chip groove 44i has a smaller chip shape radius $R_i$ than the outer partial chip groove 44a.

Another feature or aspect of an embodiment is believed at the time of the filing of this patent application to possibly reside broadly in the bit 10, wherein an outer secondary chip angle $\gamma_a$ is formed between a radial 32 running through an outer cutting corner 20 and a chip groove wall 30 of the outer partial chip groove 46a and an inner secondary chip angle $\gamma_i$ is formed between a radial 32 running through the inner cutting corner 18 and a chip groove wall 30 of the inner partial chip groove 44i, wherein the secondary chip angles $\gamma_a$, $\gamma_i$ differ from each other and in one possible embodiment the inner secondary chip angle $\gamma_i$ is smaller in terms of amount than the outer secondary chip angle $\gamma_a$.

Yet another feature or aspect of an embodiment is believed at the time of the filing of this patent application to possibly reside broadly in the bit 10, wherein the outer secondary chip angle $\gamma_a$ is a positive secondary chip angle and the inner secondary chip angle $\gamma_i$ is a negative secondary chip angle.

Still another feature or aspect of an embodiment is believed at the time of the filing of this patent application to possibly reside broadly in the bit 10, wherein the outer secondary chip angle $\gamma_a$ becomes smaller in the drill longitudinal direction.

A further feature or aspect of an embodiment is believed at the time of the filing of this patent application to possibly reside broadly in the bit 10, wherein the two partial chip grooves 44a, i converge in the drill longitudinal direction, set apart from the cutting portions 16a, c, into a common chip groove 12.

Another feature or aspect of an embodiment is believed at the time of the filing of this patent application to possibly reside broadly in the bit 10, wherein the radial length of the inner active cutting portion 16a is up to two-thirds of the total active radial cutting length.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of drills, cutting tools, and components thereof, that may possibly be utilized or adapted for use in at least one possible embodiment may possibly be found in the following U.S. Pat. No. 7,390,148, entitled "Boring tool and a cutting insert therefor"; U.S. Pat. No. 7,364,390, entitled "Drilling tool"; U.S. Pat. No. 7,360,974, entitled "Rotary cutting tool, such as a drill, comprising an exchangeable cutting insert, and an exchangeable cutting insert"; U.S. Pat. No. 7,322,777, entitled "Reamer with clamping arrangement for adjusting cutting insert and other cutting tools with clamping arrangements for adjusting cutting inserts"; U.S. Pa. No. 7,322,774, entitled "End mill and a method of operating an end mill"; U.S. Pa. No. 7,313,991, entitled "Cutting insert and use thereof"; U.S. Pa. No. 7,311,481, entitled "Milling cutter"; U.S. Pat. No. 7,201,543, entitled "Twist drill and method for producing a twist drill which method includes forming a flute of a twist drill"; U.S. Pa. No. 7,168,512, entitled "Cutting insert and milling cutter with such a cutting insert"; U.S. Pat. No. 7,090,447, entitled "Twist drill for drilling with a countersink cutting arrangement, and a cutting tool with a countersink cutting arrangement, and a cutting-chamfering tool"; U.S. Pa. No. 7,077,606, entitled "Rotating chip removing tool, such as a drilling and chamfering tool, with cutting inserts, and a milling cutter with cutting inserts"; U.S. Pat. No. 7,070,367, entitled "Twist drill for drilling having a replaceable drill tip, and a replaceable drill tip for use in a twist drill"; U.S. Pa. No. 7,048,480, entitled "Twist drill with a replaceable cutting insert and a rotary cutting tool with a replaceable cutting insert"; U.S. Pa. No. 6,988,859, entitled "Drill bit and method for grinding a drill bit"; U.S. Pa. No. 6,929,434, entitled "Rotary cutting tool"; U.S. Pa. No. 6,688,817, entitled "Drill for drilling, a method for making a drill for drilling, and a cutting tool"; U.S. Pat. No. 6,676,339, entitled "Indexable cutting insert for machining workpieces"; U.S. Pa. No. 6,655,882, entitled "Twist drill having a sintered cemented carbide body, and like tools, and use thereof"; U.S. Pat. No. 6,374,712, entitled "Disk milling cutter and suitable indexable insert"; U.S. Pat. No. 6,309,149, entitled "Twist drill for dry drilling"; U.S. Pa. No. 6,293,738, entitled "Thread cutting bit"; U.S. Pa. No. 6,231,276, entitled "Cutting tool with an insertable adjustable stop, and an adjustable stop for a cutting tool"; U.S. Pa. No. 6,164,879, entitled "Drilling tool for drilling in solid metal"; U.S. Pat. No. 6,142,485, entitled "Chuck for rotary tools"; U.S. Pa. No. 6,116,825, entitled "Rotating cutting tool with a coolant passage and a method of providing it with coolant"; U.S. Pa. No. 5,967,710, entitled "Drilling tool for drilling in solid metal"; U.S. Pa. No. 5,873,683, entitled "Boring tool"; and U.S. Pat. No. 5,800,100, entitled "Drilling tool with reset inserts".

The following patents, patent applications or patent publications, are hereby incorporated by reference as if set forth in their entirety herein: DE 44 35 857 A1, having the German title "BOHRER MIT EINEM BOHRSPITZENTEIL," published on Apr. 11, 1996; and DE 699 27 417 T2, having the following English translation of the German title "FLAT BOTTOM TOOL," published Jun. 22, 2006.

All of the patents, patent applications or patent publications, which were cited in the International Search Report dated Feb. 11, 2008, and/or cited elsewhere are hereby incorporated by reference as if set forth in their entirety herein as follows: FR 725 363, having the following French title "MÈCHE HÉLICOÏDALE AVEC ARÊTES TRANCHANTES INFÉRIEURES À GRADINS," published on May 11, 1932; EP 0 508 468, having the title "DRILL," published on Oct. 14, 1992; DE 216 607, having the following German title "METALLBOHRER MIT GETRENNTEN SCHNEIDKANTEN, DIE DURCH DEN KEGELFÖRMIGEN ANSCHLIFF DER BOHRERSPITZE ALS VOR-UND NACHBOHRERSCHNEIDEN ERSCHEINEN," published on Nov. 26, 1909; DE 36 28 262, having the following English translation of the German title "TWIST DRILL BIT," published on Jan. 14, 1988; DE 43 07 553, having the following English translation of the German title "TWIST DRILL," published on Sep. 16, 1993; JP 59 076709, having the following English translation of the Japanese title "DRILL," published on May 1, 1984; WO 98/42469, having the title "BORING BIT," published on Oct. 1, 1998; and DE 36 24 617, having the following English translation of the German title "DRILLING TOOL," published on Jan. 28, 1988.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 049 096.7, filed on Oct. 13, 2006, DE-OS 10 2006 049 096.7 and DE-PS 10 2006 049 096.7, Federal Republic of Germany Patent Application No. 10 2007 031 440.1, filed on Jul. 5, 2007, DE-OS 10 2007 031 440.1 and DE-PS 10 2007 031 440.1, and International Application No. PCT/EP2007/008595, filed on Oct. 4, 2007, having WIPO Publication No. WO 2008/046520 and inventors Bernhard Walter BORSCHERT, Ullrich Ferdinand KRENZER, and Herbert Rudolf KAUPER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/008595, German Patent Application 10 2006 049 096.7, and German Patent Application 10 2007 031 440.1 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/008595, DE 10 2006 049 096.7, and DE 10 2007 031 440.1 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A drill bit having a central rotational axis and at least one outwardly-extending cutting edge, said at least one cutting edge comprising:
a first cutting portion being disposed adjacent and to extend substantially from the drill central rotational axis;
a second cutting portion being disposed further from the drill central rotational axis than said first cutting portion;
said first and second cutting portions being configured and disposed to contact and cut a workpiece in a drilling process;
a non-cutting portion being disposed between and adjoining said cutting portions;
said non-cutting portion being configured and disposed to not contact and not cut a workpiece in a drilling process;
said first cutting portion and said non-cutting portion being disposed to meet at a first cutting corner;
said non-cutting portion being disposed radially closer to the central rotational axis than said first cutting corner;
said first cutting portion and said non-cutting portion at said cutting corner define a cutting angle of ≤90°; and
said non-cutting portion has a cross-sectional profile in a plane perpendicular to the central rotational axis which is configured such that for any point on said non-cutting portion, an extended tangent immediately on one side of the point lies on top of another extended tangent immediately on the other side of the point,
wherein:
said drill bit comprises at least one chip flute portion disposed to extend substantially along the central rotational axis from said second cutting portion,
said at least one chip flute portion having a curved cross-sectional profile in a plane perpendicular to the central rotational axis along a circular arc line of a circle having a radius,
the length of the radius is such that the circle defined by the radius lies within a free space in a plane perpendicular to the central rotational axis, which free space is defined by said first and second cutting portions and said non-cutting portion, and which free space is enclosed by an outer circle defined by the drill bit circumference, and
said non-cutting portion and said second cutting portion merge with each other without interruptions.

2. The drill bit according to claim 1, wherein:
said non-cutting portion and said second cutting portion have a crescent-shaped course cross-sectional profile in a plane perpendicular to the central rotational axis;
said second cutting portion ends at a second cutting corner;
said drill bit comprises a secondary cutting edge disposed to extend along said at least one chip flute portion from said second cutting corner; and
said at least one chip flute portion having a curvature such that a secondary chip angle greater than 20° is formed between a first line and a second line, which first line is tangential to said at least one chip flute portion at said secondary cutting edge, and which second line is a radius extending from the central rotational axis past said second cutting corner.

3. A drill bit having a central rotational axis and at least one outwardly-extending cutting edge, said at least one cutting edge comprising:
a first cutting portion being disposed adjacent and to extend substantially from the drill central rotational axis;
a second cutting portion being disposed further from the drill central rotational axis than said first cutting portion;
said first and second cutting portions being configured and disposed to contact and cut a workpiece in a drilling process;
a non-cutting portion being disposed between and adjoining said cutting portions;
said non-cutting portion being configured and disposed to not contact and not cut a workpiece in a drilling process;
said first cutting portion and said non-cutting portion being disposed to meet at a first cutting corner;
said non-cutting portion being disposed radially closer to the central rotational axis than said first cutting corner;
said first cutting portion and said non-cutting portion at said cutting corner define a cutting angle of ≤90°; and
said cutting edge has a curved cross-sectional profile in a plane perpendicular to the central rotational axis,
wherein:
said drill bit comprises at least one chip flute portion disposed to extend substantially along the central rotational axis from said second cutting portion, said at least one chip flute portion having a curved cross-sectional profile in a plane perpendicular to the central rotational axis along a circular arc line of a circle having a radius, the length of the radius is such that the circle defined by the radius lies within a free space in a plane perpendicular to the central rotational axis, which free space is defined by said first and second cutting portions and said non-cutting portion, and which free space is enclosed by an outer circle defined by the drill bit circumference, and said non-cutting portion and said second cutting portion merge with each other without interruptions.

4. The drill bit according to claim 3, wherein:

said non-cutting portion and said second cutting portion have a crescent-shaped course cross-sectional profile in a plane perpendicular to the central rotational axis;

said second cutting portion ends at a second cutting corner;

said drill bit comprises a secondary cutting edge disposed to extend along said at least one chip flute portion from said second cutting corner; and said at least one chip flute portion having a curvature such that a secondary chip angle greater than 20° is formed between a first line and a second line, which first line is tangential to said at least one chip flute portion at said secondary cutting edge, and which second line is a radius extending from the central rotational axis past said second cutting corner.

5. The drill bit according to claim 4, wherein:

said first cutting portion is oriented at an angle to said at least one chip flute;

said second cutting portion and said non-cutting portion form rims of said at least one chip flute; and the radial distance of said first cutting corner from the central rotational axis corresponds substantially to the radial distance of the portion of said non-cutting portion nearest the central rotational axis from the central rotational axis.

6. The drill bit according to claim 5, wherein:

the total radial cutting length of said at least one cutting edge is divided into approximately two thirds on said second cutting portion and approximately one third on said first cutting portion;

said at least one chip flute portion comprises at least one first chip flute portion; and said drill bit comprises at least one second chip flute portion associated with said first cutting portion and being separated from said at least one chip flute portion.

7. The drill bit according to claim 6, wherein:

an inner core radius is formed by the radial distance from the central rotational axis to the nearest portion of said at least one second chip flute portion;

an outer core radius is formed by the radial distance from the central rotational axis to the nearest portion of said at least one first chip flute portion;

the inner core radius is smaller than the outer core radius; and the inner core radius and the outer core radius vary differently in length along the central rotational axis.

8. The drill bit according to claim 7, wherein:

the outer core radius decreases in the drill longitudinal direction;

the inner core radius remains at least constant in the drill longitudinal direction;

said at least one first chip flute portion and said at least one second chip flute portion have different angles of twist; and said at least one first chip flute portion has a larger angle of twist than the angle of twist of said at least one second chip flute portion.

9. The drill bit according to claim 8, wherein:

said at least one second chip flute portion has a smaller chip shape radius than said at least one first chip flute portion;

an outer secondary chip angle is formed between a radial line running through said second cutting corner and said at least one first chip flute portion;

an inner secondary chip angle is formed between a radial line running through said first cutting corner and said at least one first chip flute portion;

the inner secondary chip angle is smaller in terms of amount than the outer secondary chip angle; and the outer secondary chip angle is a positive secondary chip angle and the inner secondary chip angle is a negative secondary chip angle.

10. The drill bit according to claim 9, wherein:

the outer secondary chip angle becomes smaller in the drill longitudinal direction;

said at least one first chip flute portion and said at least one second chip flute portion converge in the drill longitudinal direction into a common chip flute; and the radial length of said first cutting portion is up to two thirds of the total radial cutting length.

11. The drill bit according to claim 2, wherein:

said first cutting portion is oriented at an angle to said at least one chip flute;

said second cutting portion and said non-cutting portion form rims of said at least one chip flute; and the radial distance of said first cutting corner from the central rotational axis corresponds substantially to the radial distance of the portion of said non-cutting portion nearest the central rotational axis from the central rotational axis.

12. The drill bit according to claim 11, wherein:

the total radial cutting length of said at least one cutting edge is divided into approximately two thirds on said second cutting portion and approximately one third on said first cutting portion;

said at least one chip flute portion comprises at least one first chip flute portion; and said drill bit comprises at least one second chip flute portion associated with said first cutting portion and being separated from said at least one chip flute portion.

13. The drill bit according to claim 12, wherein:

an inner core radius is formed by the radial distance from the central rotational axis to the nearest portion of said at least one second chip flute portion;

an outer core radius is formed by the radial distance from the central rotational axis to the nearest portion of said at least one first chip flute portion;

the inner core radius is smaller than the outer core radius; and the inner core radius and the outer core radius vary differently in length along the central rotational axis.

14. The drill bit according to claim 13, wherein:

the outer core radius decreases in the drill longitudinal direction;

the inner core radius remains at least constant in the drill longitudinal direction;

said at least one first chip flute portion and said at least one second chip flute portion have different angles of twist; and said at least one first chip flute portion has a larger angle of twist than the angle of twist of said at least one second chip flute portion.

15. The drill bit according to claim 14, wherein:
said at least one second chip flute portion has a smaller chip shape radius than said at least one first chip flute portion;
an outer secondary chip angle is formed between a radial line running through said second cutting corner and said at least one first chip flute portion;
an inner secondary chip angle is formed between a radial line running through said first cutting corner and said at least one first chip flute portion;
the inner secondary chip angle is smaller in terms of amount than the outer secondary chip angle; and
the outer secondary chip angle is a positive secondary chip angle and the inner secondary chip angle is a negative secondary chip angle.

16. The drill bit according to claim 15, wherein:
the outer secondary chip angle becomes smaller in the drill longitudinal direction;
said at least one first chip flute portion and said at least one second chip flute portion converge in the drill longitudinal direction into a common chip flute; and
the radial length of said first cutting portion is up to two thirds of the total radial cutting length.

* * * * *